(12) United States Patent
Maker

(10) Patent No.: US 9,478,932 B2
(45) Date of Patent: Oct. 25, 2016

(54) METHOD AND APPARATUS FOR LOCKING AND SCANNING THE OUTPUT FREQUENCY FROM A LASER CAVITY

(71) Applicant: M SQUARED LASERS LIMITED, Glasgow (GB)

(72) Inventor: Gareth Thomas Maker, Glasgow (GB)

(73) Assignee: M SQUARED LASERS LIMITED, Glasgow (GB)

( * ) Notice: Subject to any disclaimer, the term of this patent is extended or adjusted under 35 U.S.C. 154(b) by 0 days.

(21) Appl. No.: 14/404,699

(22) PCT Filed: May 22, 2013

(86) PCT No.: PCT/GB2013/051350
§ 371 (c)(1),
(2) Date: Dec. 1, 2014

(87) PCT Pub. No.: WO2013/178995
PCT Pub. Date: Dec. 5, 2013

(65) Prior Publication Data
US 2015/0146747 A1    May 28, 2015

(30) Foreign Application Priority Data
Jun. 1, 2012  (GB) .................................. 1209778.8

(51) Int. Cl.
| H01S 3/10 | (2006.01) |
| *H01S 3/105* | (2006.01) |
| *G02B 26/00* | (2006.01) |
| H01S 3/083 | (2006.01) |
| H01S 3/139 | (2006.01) |
| H01S 3/081 | (2006.01) |
| H01S 3/106 | (2006.01) |

(52) U.S. Cl.
CPC ............. *H01S 3/105* (2013.01); *G02B 26/001* (2013.01); *H01S 3/1392* (2013.01); *H01S 3/083* (2013.01); *H01S 3/0816* (2013.01); *H01S 3/1062* (2013.01); *H01S 3/1394* (2013.01)

(58) Field of Classification Search
CPC .... H01S 3/105; H01S 3/1392; H01S 3/1062; H01S 3/0816; H01S 3/1394; H01S 3/083; G02B 26/001
See application file for complete search history.

(56) References Cited

U.S. PATENT DOCUMENTS

| 5,084,898 A * | 1/1992 | Dorschner | .............. H01S 3/083 356/469 |
| 6,201,638 B1 * | 3/2001 | Hall | ....................... G02F 1/395 359/346 |
| 2010/0315642 A1 * | 12/2010 | Chow | ..................... G01J 3/433 356/432 |

* cited by examiner

*Primary Examiner* — Yuanda Zhang
(74) *Attorney, Agent, or Firm* — Nixon & Vanderhye P.C.

(57) ABSTRACT

A tunable reference cavity (3) with two independently controllable mirrors (15, 16) is disclosed. The mirrors are mounted on respective piezoelectric crystals (18, 19) so that thermal expansion of the piezoelectric crystals moves the cavity mirrors in the same direction along a longitudinal axis of the reference cavity thereby reducing a change of the cavity length. Also disclosed is a system for locking and scanning the output of a laser cavity (2). An error signal is generated between an output of the laser cavity (28) and the transmission (28) of the laser through the external reference cavity (3). A dual piezo-actuated mirror (6b) permits processing of the error signal (26) with separate signal processing circuits (29a, 29b) used to provide an electrical feedback signal to the dual piezoelectric crystal (22, 23b).

14 Claims, 4 Drawing Sheets

METHOD AND APPARATUS FOR LOCKING AND SCANNING THE OUTPUT FREQUENCY FROM A LASER CAVITY

This application is the U.S. national phase of International Application No. PCT/GB2013/051350 filed 22 May 2013 which designated the U.S. and claims priority to GB Patent Application No. 1209778.8 filed 1 Jun. 2012, the entire contents of each of which are hereby incorporated by reference.

The present invention relates to the field of laser sources and in particular to a method and apparatus for locking and scanning the output from a laser cavity.

The use of single frequency lasers relies heavily on the ability to select a longitudinal mode of the laser cavity and maintain it for an extended period of time. This may also include tracking the mode if the length of laser cavity is scanned in order to change the output frequency. This selection is normally carried out by a combination of optical elements inserted into the cavity and or the use of an external reference cavity. The intracavity elements may for example include birefringent filters and etalons.

In the case of widely tuneable laser media, the frequency selection requirements placed on these optical elements are particularly stringent. The first requirement results from the fact that the desired mode of operation is one of a great number of possible longitudinal modes on which the cavity may operate. Secondly, the need to tune the laser frequency implies that the selecting element has to be tuned as well, typically by being rotated around one of its axes. As a result, the mounting techniques employed to allow the selecting element to be rotated make the laser frequency prone to drifting while mechanical noise induced by these elements contribute to the broadening of the linewidth of the output field.

A number of widely tuneable single frequency laser gain media are known to those skilled in the art e.g. Dyes, Ti:Sapphire, Cr:LiCaF and transition metal doped chalcogenides such as Cr:ZnSe. The tuning range provided by these gain media is in excess of 50 THz (or more than 100 nm). The laser cavity modes of which a single one has to be selected are typically spaced by a few hundred MHz. As previously mentioned, selection is achieved by insertion within the cavity of a number of optical elements, each of which introduces an operating power loss that is a periodic function of the laser frequency. This period is referred to as the free spectral range (FSR) of the element. Typically, the elements chosen to achieve single frequency operation are selected to have successively smaller free spectral ranges corresponding to successively narrower regions of low insertion loss.

The optical arrangement is configured such that only one longitudinal laser mode is capable of oscillating at a frequency corresponding to a loss minimum of all of the inserted elements. The exact requirements for the mode selecting elements are known to depend on the amount of inhomogeneous to homogeneous broadening in the gain medium as well as any spatial-hole burning effects. In addition, a number of other factors are also known to act to broaden the linewidth of the output of a laser cavity e.g. temperature, refractive index changes, mechanical vibrations, etc.

With the ever increasing number of applications for laser sources, there is an ongoing desire to provide lasers with outputs that exhibit as narrow a linewidth as possible. For example laser sources of narrow linewidth are highly desirable for use within optical sensors and for use in the fields of optical communications and optical frequency metrology.

It is therefore an object of an embodiment of the present invention to provide alternative methods and apparatus for locking and scanning the output of the laser cavity which provide the laser output with a reduced linewidth over those techniques known in the art.

SUMMARY OF INVENTION

According to a first aspect of the present invention there is provided a locking and scanning apparatus for a laser cavity the apparatus comprising an external reference cavity and a locking and scanning circuit electrically connected to a dual piezo-actuated mirror of the laser cavity wherein the circuit comprises:
   a signal generator for generating an error signal between an output from the laser cavity and an output from the external reference cavity;
   a first signal processing circuit for processing a first component of the error signal so as to provide a feedback signal for a first piezoelectric crystal of the dual piezo-actuated mirror; and
   a second signal processing circuit for processing a second component of the error signal so as to provide a feedback signal for a second piezoelectric crystal of the dual piezo-actuated mirror.

The above described apparatus provides a locking and scanning circuit which provides the laser output with a narrower linewidth when compared with those circuits known in the art. Separating the signal processing circuitry into distinct signal paths allows for each to be optimised to suit the characteristics of the corresponding piezoelectric crystal. This enables the 'loop gain' of the processing circuits to be maximised while maintaining stability of the control loop. The frequency modulation noise (linewidth) of the laser thus reduces towards the intrinsic noise level of the reference cavity as maximum stable loop gain is increased.

It is preferable for the thickness of the second piezoelectric crystal to be less than the thickness of the first piezoelectric crystal. Most preferably the second piezoelectric crystal is configured such that it may be driven at a higher frequency than the first piezoelectric crystal.

As a result, the first piezoelectric crystal preferably provides a means for scanning the locked single longitudinal cavity mode while the second piezoelectric crystal provides a means for locking the operation of the laser cavity to a single longitudinal cavity mode. The first piezoelectric crystal may have a thickness of 4 mm. The configuration of the first piezoelectric crystal preferably allows it to be driven at a frequency of less than 10 kHz.

The second piezoelectric crystal may have a thickness of less than 1 mm. Most preferably the second piezoelectric crystal has a thickness less than 0.5 mm. The second piezoelectric crystal may have a thickness of 0.1 mm.

The configuration of the second piezoelectric crystal preferably allows it to be driven at a frequency greater than 15 kHz. Most preferably the configuration of the second piezoelectric allows it to be driven at a frequency of 100 kHz or more.

According to a second aspect of the present invention there is provided a laser system comprising a laser cavity and a locking and scanning apparatus in accordance with the first aspect of the present invention.

Embodiments of the second aspect of the present invention may comprise features to implement the preferred or optional features of the first aspect of the invention or vice versa.

According to a third aspect of the present invention there is provided a method for locking and scanning a laser cavity comprising a dual piezo-actuated mirror the method comprising:
providing the laser cavity with an external reference cavity;
generating an error signal between an output from the laser cavity and an output from the external reference cavity;
processing a first component of the error signal so as to provide a feedback signal for a first piezoelectric crystal of the dual piezo-actuated mirror; and
processing a second component of the error signal so as to provide a feedback signal for a second piezoelectric crystal of the dual piezo-actuated mirror.

Independently processing the feedback signals for the first and second piezoelectric crystal of the dual piezo-actuated mirror is advantageous in that it produces laser output that exhibits a narrower linewidth when compared with those methods known in the art.

Preferably the feedback signal for the first piezoelectric crystal provides a means for scanning the locked single longitudinal cavity mode.

The feedback signal for the second piezoelectric crystal may provide a means to lock the operation of the laser cavity to a single longitudinal cavity mode.

The feedback signal for first piezoelectric crystal may drive the first piezoelectric crystal at a frequency of less than 10 kHz.

Preferably the feedback signal for second piezoelectric crystal drives the second piezoelectric crystal at a frequency greater than 15 kHz. Most preferably, the feedback signal for second piezoelectric crystal drives the second piezoelectric crystal at a frequency of 100 kHz or more.

Embodiments of the third aspect of the present invention may comprise features to implement the preferred or optional features of the first or second aspects of the invention or vice versa.

According to a fourth aspect of the present invention there is provided an external reference cavity for locking and scanning a laser cavity, the external reference cavity comprising a first cavity mirror, a second cavity mirror and a reference cavity drive system wherein the reference cavity drive system provides a means for independently controlling the position of the first cavity mirror within the reference cavity.

It is advantageous to employ only a single mirror for scanning the locked laser cavity since the noise induced on the output of the laser cavity is effectively halved when compared to known external reference cavities which achieve scanning by simultaneously driving the first and second cavity mirrors in anti-phase.

Most preferably the reference cavity drive system also provides a means for independently controlling the position of the second cavity mirror within the reference cavity. In this way, the external reference cavity can still provide the desirable functionality of being able to incorporate an external input signal for locking the laser cavity to an absolute frequency reference, e.g., an atomic absorption line or a third-party high-precision wavemeter.

Most preferably the first cavity mirror is mounted on a first piezoelectric crystal and the second cavity mirror is mounted on a second piezoelectric crystal wherein the first and second piezoelectric crystals are mechanically mounted within the reference cavity such that thermal expansion of the first and second piezoelectric crystals acts to move the first and second cavity mirrors in the same direction along a longitudinal axis of the reference cavity.

Embodiments of the fourth aspect of the present invention may comprise features to implement the preferred or optional features of the first to third aspects of the invention or vice versa.

According to a fifth aspect of the present invention there is provided a laser system comprising a laser cavity the laser cavity being slaved to an external reference cavity in accordance with the fourth aspect of the present invention.

Embodiments of the fifth aspect of the present invention may comprise features to implement the preferred or optional features of the first to third aspects of the invention or vice versa.

According to a sixth aspect of the present invention there is provided a method for driving an external reference cavity comprising a first cavity mirror and a second cavity mirror the method comprising independently controlling the position of the first cavity mirror within the reference cavity.

Most preferably the method further comprises independently controlling the position of the second cavity mirror within the reference cavity.

Embodiments of the sixth aspect of the present invention may comprise features to implement the preferred or optional features of the first to fifth aspects of the invention or vice versa.

According to a seventh aspect of the present invention there is provided a laser system comprising a laser cavity the laser cavity being slaved to an external reference cavity in accordance with the fourth aspect of the present invention.

Most preferably the laser cavity is slaved to an external reference cavity by a locking and scanning apparatus in accordance with the first aspect of the present invention.

Embodiments of the seventh aspect of the present invention may comprise features to implement the preferred or optional features of the first to sixth aspects of the invention or vice versa.

According to an eighth aspect of the present invention there is provided an external reference cavity for locking and scanning a laser cavity the external reference cavity comprising a first cavity mirror mounted on a first piezoelectric crystal and a second cavity mirror mounted on a second piezoelectric crystal wherein the first and second piezoelectric crystals are mechanically mounted within the reference cavity such that thermal expansion of the first and second piezoelectric crystals acts to move the first and second cavity mirrors in the same direction along a longitudinal axis of the reference cavity.

The above described external reference cavity provides an opto-mechanical arrangement that acts to compensate for the effects of thermal drift within the cavity.

Preferably the external reference cavity further comprises a reference cavity drive system wherein the reference cavity drive system provides a means for independently controlling the position of the first cavity mirror within the reference cavity.

Embodiments of the eighth aspect of the present invention may comprise features to implement the preferred or optional features of the first to seventh aspects of the invention or vice versa.

BRIEF DESCRIPTION OF DRAWINGS

Aspects and advantages of the present invention will become apparent upon reading the following detailed description and upon reference to the following drawings in which.

Figure 1:
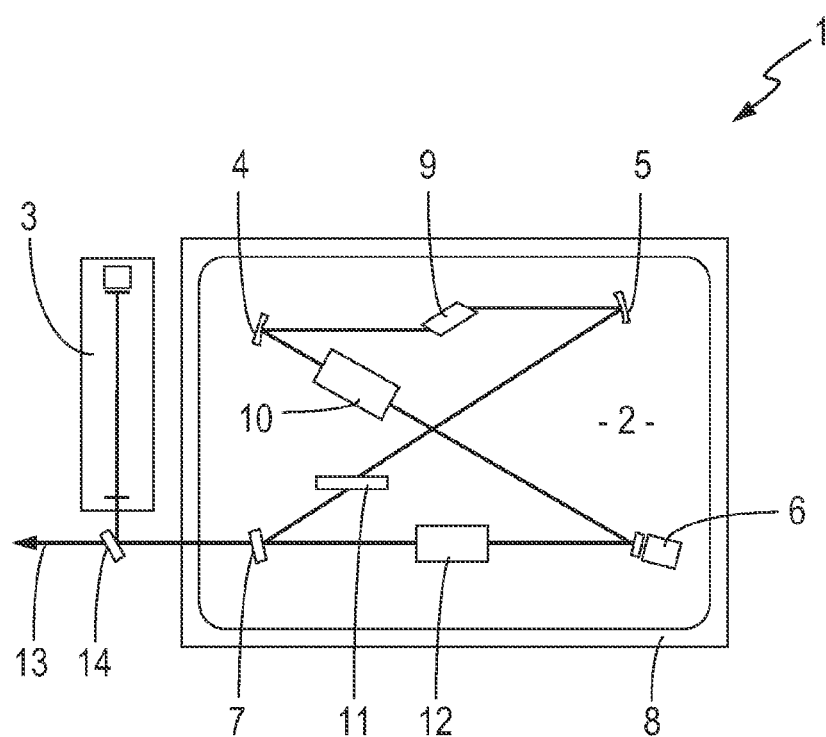
FIG. 1 presents a schematic representation of a Ti: Sapphire laser that incorporates active stabilisation apparatus in accordance with embodiments of the present invention.

In the description which follows, like parts are marked throughout the specification and drawings with the same reference numerals. The drawings are not necessarily to scale and the proportions of certain parts have been exaggerated to better illustrate details and features of embodiments of the invention.

DETAILED DESCRIPTION

Methods and apparatus for locking and scanning the output from a laser cavity while reducing the associated linewidth cavity will now be described in detail with reference to FIGS. 1 to 5. In particular, FIG. 1 presents a schematic illustration of a Ti:Sapphire laser 1 that incorporates active stabilisation apparatus. In the presently described embodiment, the laser 1 can be seen to comprise a laser cavity 2 and an external reference cavity 3.

The laser cavity 2 exhibits a bow-tie ring cavity geometry defined by a first mirror 4, a second mirror 5, a piezo-actuated mirror 6 and an output coupler 7 all of which are located within a mechanically stable housing 8. Located within the cavity 2 is a Ti:Sapphire gain medium 9 (between the first 4 and second 5 mirrors); an optical diode 10 (between the first 4 and piezo-actuated 6 mirrors); a birefringent filter (BRF) 11 (between the second mirror 5 and the output coupler 7); and an air-spaced etalon 12 (between the piezo-actuated mirror 6 and the output coupler 7). It is a combination of the ring cavity geometry and the optical diode 10 that forces the laser cavity 2 to operate in a unidirectional manner, resulting in a travelling intracavity wave that removes the detrimental effects of spatial-hole burning within the gain medium 9.

Given that the optical absorption within Ti: Sapphire occurs over a broad wavelength range from ~400 nm to ~600 nm, the gain medium 9 can be optically pumped by any commercially available continuous-wave "green" laser e.g. a 532 nm diode pumped solid-state laser source (not shown). Pumping of the gain medium 9 preferably takes place through the second mirror 5.

In order to tune the wavelength of laser output 13, the intracavity BRF 11 is employed. The BRF 11 introduces a wavelength-dependent loss into the cavity 2, and wavelength tuning is accomplished by rotation of the BRF 11. The BRF 11 provides a relatively rapid but coarse wavelength adjustment. In the absence of any further linewidth narrowing techniques the laser output 13 exhibits a linewidth of ~8 GHz.

The introduction of the air-spaced etalon 12 to the laser cavity 2 acts to further narrow the linewidth operation of the laser 1. This is because the air-spaced etalon 12 introduces a spectral loss into the cavity 2 that has a narrower transmission bandwidth than that exhibited by the BRF 11. By electronically adjusting the spacing of the air-spaced etalon 12 the laser output 13 can also be finely tuned. Long-term single mode operation for the laser cavity 2 can also be achieved through the electronic servo locking of the intracavity air-spaced etalon 12, a technique known to those skilled in the art. This technique involves locking the peak of the air-spaced etalon's 12 transmission function to the nearest cavity 2 longitudinal mode (within the capture range of the servo loop) by dithering the spacing of the air-spaced etalon 12. In the absence of any further linewidth narrowing techniques, the laser output 13 exhibits a linewidth of ~5 MHz.

The piezo-actuated mirror 6 provides a means for maintaining a single longitudinal mode operation as the laser frequency is tuned since accurate control of the piezo-actuated mirror 6 allows the cavity length to be changed precisely, and to be adjusted to match the single oscillating longitudinal cavity mode frequency as the cavity length is tuned. With the air-spaced etalon 12 peak lock circuit engaged, the peak transmission of the air-spaced etalon 12 is then kept locked to this oscillating longitudinal mode frequency (to within the capture range of the locking circuit), even as this frequency is tuned by the piezo-actuated mirror 6. In the absence of any further linewidth narrowing techniques, the laser output 13 exhibits an increased linewidth of about a factor of two to ~10 MHz. This is a result of the mechanical noise introduced to the laser cavity 2 by the operation of the piezo-actuated mirror 6. Thus there exists a known trade off between being able to tune a single longitudinal mode of the laser cavity 2 with the linewidth of the laser output 13.

An alternative known technique to induce single mode operation, and to provide a means for scanning the output frequency of the laser cavity, is to slave the laser cavity 2 to an external reference cavity 3. This is achieved by employing a pick off mirror 14 so as to redirect a small portion of the output 13 from the laser cavity 2 into the external reference cavity 3. A dual piezo-actuated mirror 6a electrically connected to a locking and scanning circuit provides the means for the external reference cavity 3 to control the laser cavity 2, further details of which are provided below.

Figure 2:
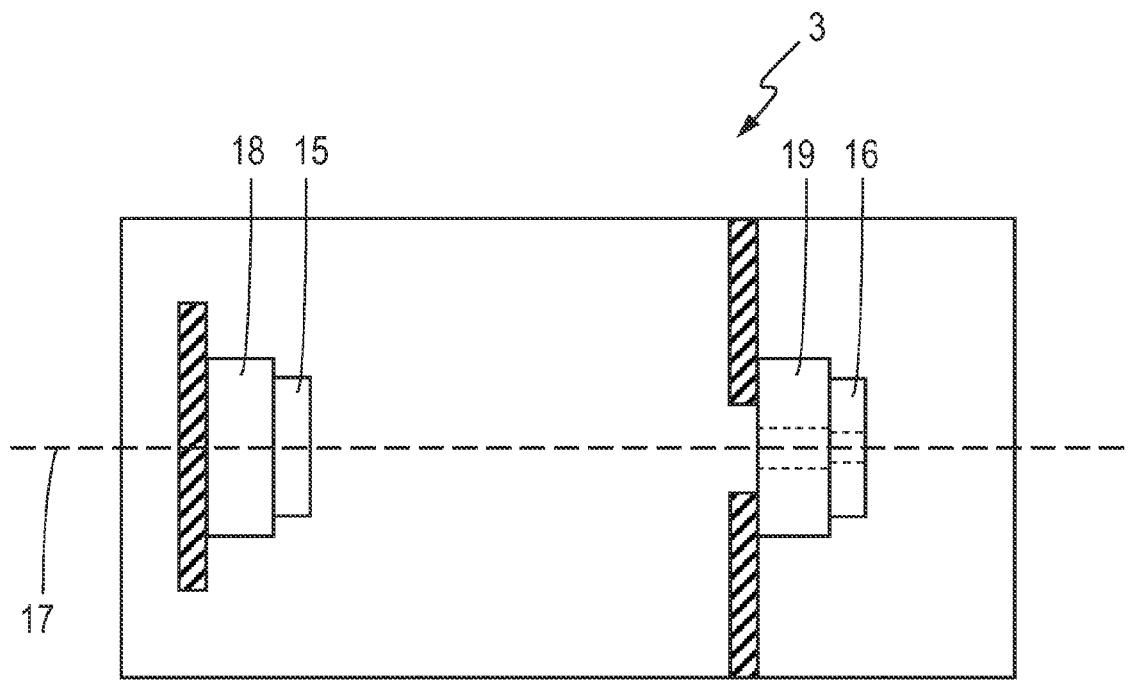
FIG. 2 presents a schematic representation of an external reference cavity employed by the Ti: Sapphire laser of FIG. 1.

With reference to FIG. 2, the external reference cavity 3 can be seen to comprise a high stability, high finesse, linear cavity defined by first and second cavity mirrors, generally depicted by reference numerals 15 and 16. A longitudinal axis 17 is included in this Figure for ease of reference. The first 15 and second 16 cavity mirrors are mounted on first and second piezoelectric crystals, generally depicted by reference numerals 18 and 19, so as to allow for scanning of the reference cavity (as described in further detail below). The first mirror 15 and the second mirror 16 differ only in that an aperture 20 is formed thorough the second mirror 16 so as to allow light to pass through this component. In a similar manner, the first piezoelectric crystal 18 and the second piezoelectric crystal 19 differ only in that an aperture 21 is formed through the second piezoelectric crystal 19 so as to again allow light to propagate through this component.

Piezoelectric crystals 18 and 19 are known to have high temperature coefficients of expansion therefore the piezoelectric crystals 18 and 19 are mechanically mounted such that their thermal expansion causes both cavity mirrors 15 and 16 to move in the same direction along the longitudinal axis 17. In this way the opto-mechanical arrangement of the external reference cavity 3 acts to compensate for the effects of thermal drift.

Figure 3A:
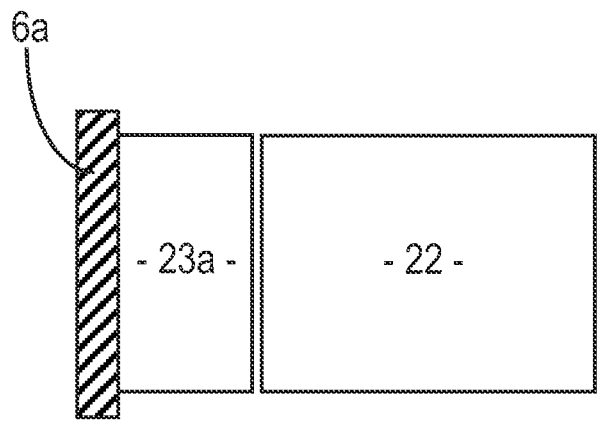
FIG. 3 provides a schematic representations of two dual piezo-actuated mirror suitable for use within the laser system of FIG. 1.

FIG. 3(a) presents a schematic representation of a first embodiment of the dual piezo-actuated mirror 6a. In this embodiment, a first piezoelectric crystal 22 in the dual stack provides for a length variation so as to tune the laser cavity 2 over the desired length, typically about 30 GHz. Its physical thickness is around 4 mm. Its physical configuration is such that the maximum frequency at which it can be driven is less than 10 kHz and for this reason the piezoelectric crystal 22 is referred to as the "slow piezo". The second piezoelectric crystal 23a in the dual stack is around 0.5 mm thick and so provides very little tuning range, typically only around 100 MHz. Its physical configuration however allows it to be driven at a much higher frequency, around 20 kHz, when compared to the first piezoelectric crystal 22, and for this reason the piezoelectric crystal 23a is referred to as the "fast piezo". The primary function of the fast piezo 23a is to assist in reducing the intrinsic noise of the laser cavity 2 and so reduce the linewidth of the laser output 13.

Figure 3B:
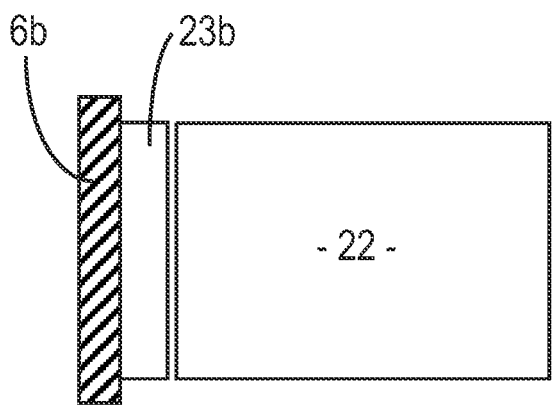

FIG. 3(b) presents a preferred embodiment of the dual piezo-actuated mirror 6b. This embodiment is similar to that described above with reference to FIG. 3(a) with the exception that the fast piezo 23b now has a thickness of around 0.1 mm and a physical configuration which allows it to be driven at even higher frequencies, typically 100 kHz or more. The increased differences in the drive frequency between the fast piezo 23b and the slow piezo 22 can be exploited to provide improved locking electronics, as described in further detail below with reference to FIG. 4(b).

Locking and scanning of the laser cavity 2 on a single longitudinal mode can be achieved as follows. A fringe pattern is generated by the interference between the laser output 13 and an output from the reference cavity 3 generated by fraction of the output beam 13 being diverted into the reference cavity 3 by the pick off mirror 14. The fringe voltage is a measure of the wavelength of laser output 13 relative to a mode of the reference cavity 3. Thus by holding the fringe voltage at a fixed fraction (typically 50%) of its peak value indicates that the wavelength of the laser output 13 is 'locked' to a mode of the reference cavity 3.

The locking system holds the wavelength of the laser output 13 constant by providing a feedback signal to the piezo-actuated mirrors 6a or 6b in the laser cavity 2. Traditionally, with the dual piezo-actuated mirror 6a of FIG. 3(a) the feedback signal would be generated by a locking and scanning circuit 24 as represented by the block diagram of FIG. 4(a). In a first block 25 an error signal 26 is generated by comparing a fringe voltage 27 relative to a voltage which is proportional to the laser's output power 28. The error signal is then processed and equalised within a signal processing circuit 29.

A first component of the processed and equalised error signal 30 is filtered by a low pass filter 31 and then amplified by a first high voltage amplifier 32 so as to provide a feedback signal 33 to the slow piezo 22 and so provide a means for scanning the locked laser cavity 2. A second component of the processed and equalised error signal 34 is similarly amplified by a second high voltage amplifier 35 so as to provide a feedback signal 36 to the fast piezo 23a.

Figure 4A:
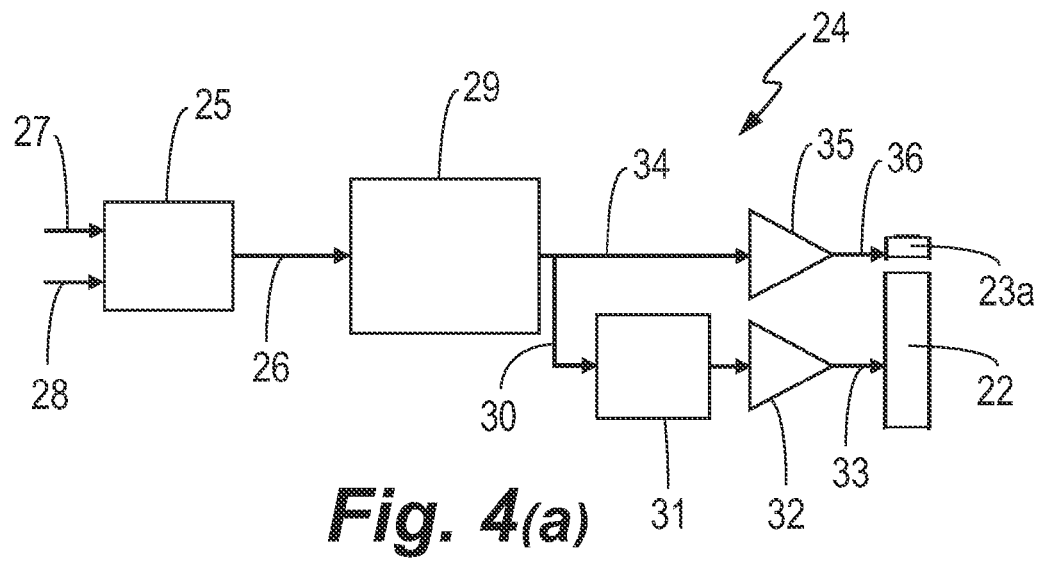
FIG. 4 provides block diagrams of two locking and scanning circuits for controlling the dual piezo-actuated mirrors of FIG. 3.
Figure 4B:
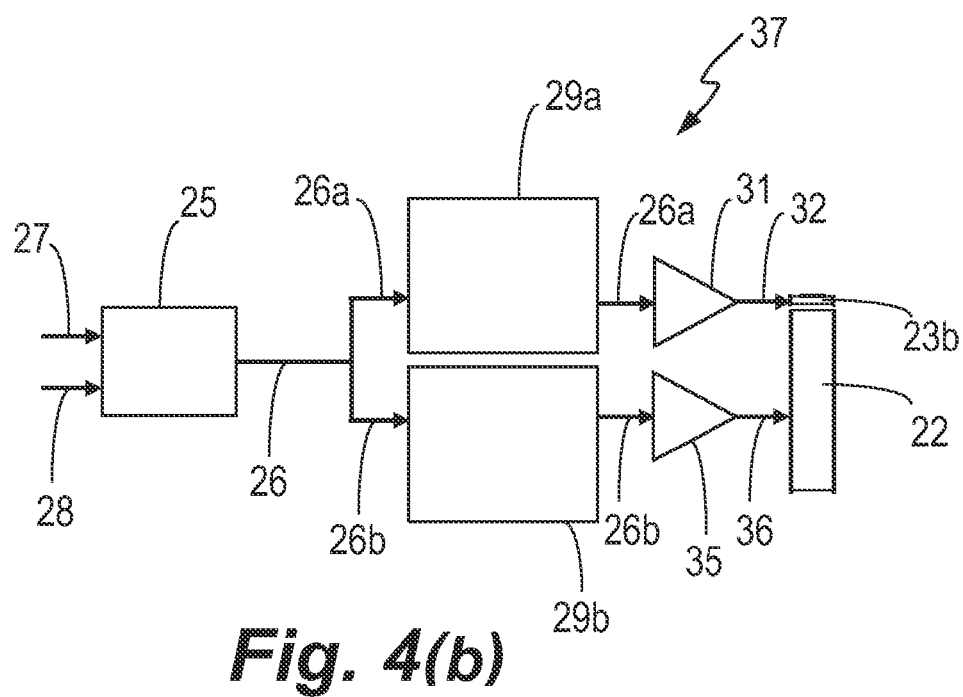

Alternatively, with the dual piezo-actuated mirror 6b of FIG. 3(b) the feedback signal would be generated by a locking and scanning circuit 37 as represented by the block diagram of FIG. 4(b). The first block 25 again generates an error signal 26 by comparing the fringe voltage 27 relative to a voltage which is proportional to the laser output power 28. The error signal 26 is however split into two components 26a and 26b before being independently processed and equalised within dedicated signal processing circuit 29a and 29b, respectively. The processed and equalised error signal 26a is then amplified by a first amplifier 35 so as to provide a feedback signal 36 to the fast piezo 23b. The processed and equalised error signal 26b is similarly amplified by the second amplifier 32 so as to provide the feedback signal 33 to the slow piezo 22.

By separating error signal 26 into two components the two signals 26a and 26b can be individually optimised for noise, dynamic range, direct current (DC) and high frequency performance corresponding to their associated piezoelectric crystal 22 and 23b, respectively. This allows the control loop gain of the signal processing circuit 29a to be maximised which results in the linewidth of the laser output 13 being reduced when the laser cavity 2 is locked to the external reference cavity 3.

With the laser cavity 2 locked to the external reference cavity 3 as described above, the laser's output frequency can then be scanned (or offset) by scanning (or adjusting) the reference cavity length 3. Traditionally, this is achieved through the employment of a reference cavity drive system 38 as depicted by the block diagram of FIG. 5(a). In the first instance a control system 39 generates a first input signal 40 for a signal processing circuit 41.

It is often desirable to also be able to provide a means for locking the laser cavity 2 to an absolute frequency reference, such as an atomic absorption line or a third-party high-precision wavemeter. The external reference cavity 3 facilitates this functionality by providing an external input on the signal processing circuit 41 suitable for receiving a second input signal 42 which may be any suitable frequency error signal e.g. a feedback signal from a wavemeter or a transmitted or reflected signal from an atomic cell.

The first input signal 40 and, if present, the second input signal 42 are then processed within the signal processing circuit 41 so as to produce a first driving signal 43 for the first piezoelectric crystal 18 and a second driving signal 44 for the second piezoelectric crystal 19. Both the first 43 and second 44 driving signals are electrically connected to the respective piezoelectric crystal 18 and 19 via high voltage amplifiers 45 and 46, respectively. These signals 43 and 44 are configured to simultaneously drive the first 18 and second piezoelectric crystals 19 in anti-phase such that they move in equal and opposite directions along the longitudinal axis 17. The thickness of the first 18 and second piezoelectric crystals 19 are such that they allow the external reference cavity 3 to be scanned by around 120 GHz.

As can be seen from the above, the design of the reference cavity 3 is such that it uses only a small fraction of the total available deflection of the first 18 and second piezoelectric crystals 19. Therefore, the reference cavity length can be adjusted with a high degree of precision, enabling precise scans of the laser cavity's 2 output frequency. With this arrangement the laser cavity 2 has been demonstrated to provide an output that exhibits a linewidth of ~50 kHz and an absolute frequency drift of around 100 MHz/hr/° C. The amount of electrical noise reaching the reference cavity 3 is critical to the overall performance of the laser cavity 2. The observed linewidths are therefore affected by the noise induced by the movement of the first 18 and second piezoelectric crystals 19. Inherent noise on the second input signal 42 from the external source, when present, also acts as a source of broadening of the linewidth of the output of the laser cavity 2. In order to address these detrimental effects, it has proved highly beneficial to split the functionality of the first 15 and second mirrors 16 of external reference cavity 3. This is achieved by replacing the reference cavity drive system 38 presented in FIG. 5(a) with the reference cavity drive system 47 of FIG. 5(b).

Figure 5A:
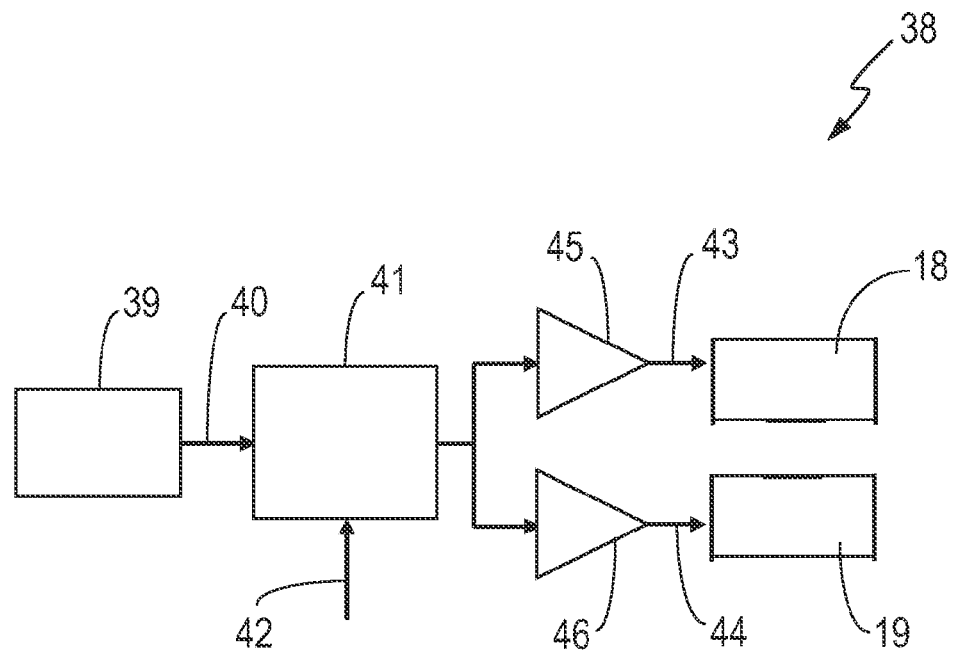
FIG. 5 provides block diagrams of two reference cavity drive circuits for driving the external reference cavity of the Ti: Sapphire laser of FIG. 1.
Figure 5B:
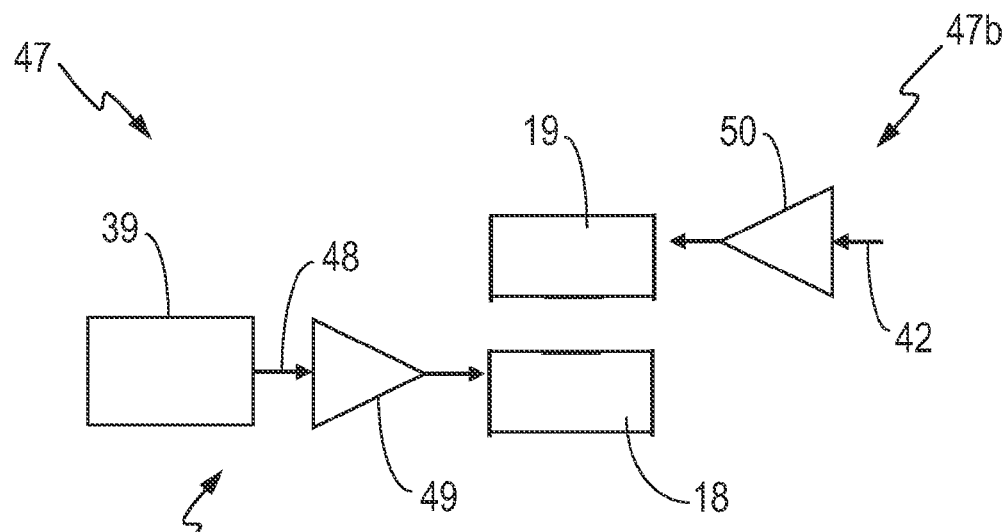

In particular, FIG. 5(b) can be seen to comprise two independent cavity drive systems 47a and 47b. The first cavity drive system 47a is employed to drive only the first piezoelectric crystal 18 and hence the first reference cavity mirror 15 only. In the first cavity drive system 47a a control system 39 again generates an input signal 48 which is electrically connected to the first piezoelectric crystal 18 via a first high voltage amplifier 49. The second cavity drive system 47b is employed to drive only the second piezoelectric crystal 19 and hence the second reference cavity mirror 16 only. In the second cavity drive system 47b the second, external input signal 42 is electrically connected to the second piezoelectric crystal 18 via a second high voltage amplifier 50.

With this arrangement the first 15 and second reference cavity mirror 16 move independently of each other. Scanning of the laser cavity 2 is controlled primarily by the first reference cavity mirror 15 since in the absence of the second, external input signal 42 the second reference cavity mirror 16 remains stationary. It will be appreciated that this effectively reduces the scanning range of the external reference cavity 3 to around 60 GHz. However, this scanning range is still a factor of two greater than the total available deflection of the first 22 and second piezoelectric crystals 23 of the laser cavity 2. This is found to be more than sufficient to still allow the reference cavity length to be adjusted with a high degree of precision, enabling precise scans of the laser cavity's 2 output frequency.

Of significant advantage is the fact that by splitting the functionality of the first 15 and second mirrors 16 of the external reference cavity 3, the noise induced on the output of the laser cavity 2 is effectively halved. This can be accounted for by the fact that the reference cavity drive system 47a comprises less electronic circuitry when compared to the reference cavity drive system 39. Furthermore, with reference cavity drive system 47 only one piezoelectric crystal 18 of the external reference cavity 3 is being employed to scan the laser cavity 2.

It will be appreciated by the skilled reader that in an alternative embodiment the reference drive system may comprise only the first cavity drive system 47a such that there would be no facility to move the second reference cavity mirror 16. Although such an embodiment would still be beneficial in reducing the linewidth of the laser output 13 it would remove the desirable functionality of being able to incorporate an external input signal 42.

By taking advantage of the dual piezo-actuated mirror 6b of FIG. 3(b) and employing the locking and scanning circuit 37, as represented by the block diagram of FIG. 4(b), in conjunction with the reference cavity drive system 47 of FIG. 5(b), has allowed the laser cavity 2 to produce a single mode output 13 that can be scanned tens of GHz and which exhibits a linewidth of under 10 kHz. This compares favourably to the linewidths of hundreds of kHz found in those scanning systems known in the art which do not employ these components.

Although all of the above embodiments have been described with reference to a Ti:Sapphire laser system having a bow-tie ring cavity geometry, it will be appreciated by the skilled reader that the apparatus and techniques are not limited to use with such systems. These components could equally well be applied to any alternative laser cavity which employs a dual piezo-actuated mirror and an external cavity for locking and scanning purposes.

Described above are two systems which can be employed to lock and scan the output of a laser cavity. The first involves the use of a dual piezo-actuated mirror which permits separate processing of the error signal used to provide an electrical feedback signal to the two piezoelectric crystals. The second involves a reference cavity drive system which acts to split the functionality of the first and second mirrors of an external reference cavity employed to lock and scan the laser cavity. When applied independently, or together, the described methods and apparatus can be used to lock and scan the output of the laser cavity while providing the laser output with a reduced linewidth when compared to those laser systems known in the art.

Throughout the specification, unless the context demands otherwise, the terms "comprise" or "include", or variations such as "comprises" or "comprising", "includes" or "including" will be understood to imply the inclusion of a stated integer or group of integers, but not the exclusion of any other integer or group of integers.

Furthermore, reference to any prior art in the description should not be taken as an indication that the prior art forms part of the common general knowledge.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. An external reference cavity for locking and scanning a laser cavity, the external reference cavity comprising:
   a first cavity mirror,
   a second cavity mirror, and
   a reference cavity drive system, wherein the reference cavity drive system provides a means for independently controlling the position of the first and second cavity mirrors within the reference cavity,
   wherein the first cavity mirror is mounted on a first reference cavity piezoelectric crystal and the second cavity mirror is mounted on a second reference cavity piezoelectric crystal, wherein the first and second reference cavity piezoelectric crystals are mechanically mounted within the reference cavity to allow thermal expansion of the first and second reference cavity piezoelectric crystals to move the first and second cavity mirrors in the same direction along a longitudinal axis of the reference cavity.

2. A laser system comprising a laser cavity, the laser cavity being slaved to the external reference cavity claimed in claim 1.

3. The laser system as claimed in claim 2, wherein the laser cavity is slaved to the external reference cavity by a locking and scanning apparatus connected to a dual piezo-actuated laser cavity mirror wherein the locking and scanning apparatus comprises;
   a signal generator for generating an error signal between an output from the laser cavity and an output from the external reference cavity;
   a first signal processing circuit for processing a first component of the error signal so as to provide a feedback signal for a first piezoelectric crystal of the dual piezo-actuated laser cavity mirror; and
   a second signal processing circuit for processing a second component of the error signal so as to provide a feedback signal for a second piezoelectric crystal of the dual piezo-actuated laser cavity mirror.

4. The laser system as claimed in claim 3, wherein the thickness of the second piezoelectric crystal of the dual piezo-actuated laser cavity mirror is less than the thickness of the first piezoelectric crystal of the dual piezo-actuated laser cavity mirror.

5. The laser system as claimed in claim 3, wherein the configuration of the second piezoelectric crystal of the dual piezo-actuated laser cavity mirror allows it to be driven at a higher frequency than the first piezoelectric crystal of the dual piezo-actuated laser cavity mirror.

6. The laser system as claimed in claim 3, wherein the first piezoelectric crystal of the dual piezo-actuated laser cavity mirror provides a means for scanning the locked single longitudinal cavity mode.

7. The laser system as claimed in claim 3, wherein the second piezoelectric crystal of the dual piezo-actuated laser cavity mirror provides a means to lock the operation of the laser cavity to a single longitudinal cavity mode.

8. The laser system as claimed in claim 3, wherein the first piezoelectric crystal of the dual piezo-actuated laser cavity mirror has a thickness of 4 mm.

9. The laser system as claimed in claim 3, wherein the configuration of the first piezoelectric crystal of the dual piezo-actuated laser cavity mirror allows it to be driven at a frequency of less than 10 kHz.

10. The laser system as claimed in claim 3, wherein the second piezoelectric crystal of the dual piezo-actuated laser cavity mirror has a thickness of less than 1 mm.

11. The laser system as claimed in claim 3, wherein the second piezoelectric crystal of the dual piezo-actuated laser cavity mirror has a thickness of less than 0.5 mm.

12. The laser system as claimed in claim 3, wherein the configuration of the second piezoelectric of the dual piezo-actuated laser cavity mirror allows it to be driven at a frequency greater than 15 kHz.

13. The laser system as claimed in claim 3, wherein the configuration of the second piezoelectric of the dual piezo-actuated laser cavity mirror allows it to be driven at a frequency of 100 kHz or more.

14. A method for driving an external reference cavity comprising a first cavity mirror and a second cavity mirror, wherein the first cavity mirror is mounted on a first reference cavity piezoelectric crystal and the second cavity mirror is mounted on a second reference cavity piezoelectric crystal, wherein the first and second reference cavity piezoelectric crystals are mechanically mounted within the reference cavity to allow thermal expansion of the first and second reference cavity piezoelectric crystals to move the first and second cavity mirrors in the same direction along a longitudinal axis of the reference cavity, the method comprising independently controlling the position of the first and second cavity mirrors within the reference cavity.

* * * * *